(12) United States Patent
Schnell (10) Patent No.: US 12,508,763 B2
(45) Date of Patent: Dec. 30, 2025

(54) DEVICE AND METHOD FOR MANUFACTURING PLASTIC CONTAINERS

(71) Applicant: KOCHER-PLASTIK MASCHINENBAU GMBH, Sulzbach-Laufen (DE)

(72) Inventor: Michael Schnell, Essingen (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 176 days.

(21) Appl. No.: 18/011,274

(22) PCT Filed: Jun. 28, 2021

(86) PCT No.: PCT/EP2021/067718
§ 371 (c)(1),
(2) Date: Dec. 19, 2022

(87) PCT Pub. No.: WO2022/022925
PCT Pub. Date: Feb. 3, 2022

(65) Prior Publication Data
US 2023/0226743 A1    Jul. 20, 2023

(30) Foreign Application Priority Data

Jul. 28, 2020 (DE) ..................... 10 2020 004 564.2

(51) Int. Cl.
*B29C 49/04* (2006.01)
*B29C 48/00* (2019.01)
(Continued)

(52) U.S. Cl.
CPC .... *B29C 49/04102* (2022.05); *B29C 48/0017* (2019.02); *B29C 48/09* (2019.02);
(Continued)

(58) Field of Classification Search
CPC ......... B29C 49/00; B29C 49/46; B29C 48/09; B29C 49/04102; B29C 49/04106;
(Continued)

(56) References Cited

U.S. PATENT DOCUMENTS 4,560,340 A * 12/1985 Younkin ................. B29C 49/32
425/534
6,145,285 A   11/2000 Anderson
(Continued)

FOREIGN PATENT DOCUMENTS

DE    2 052 460    5/1971
DE    203 07 904   7/2003
(Continued)

OTHER PUBLICATIONS

Machine Translation of Kuenz (WO2009135682A2), Nov. 12, 2009 (Generated Jul. 29, 2024), Espacenet (Year: 2009).*
(Continued)

*Primary Examiner* — Andrew L Swanson
(74) *Attorney, Agent, or Firm* — Wenderoth, Lind & Ponack, L.L.P.

(57) ABSTRACT

A device for producing plastic containers (10) by a molding, filling and sealing process includes a molding device (16) having individual molding tools (18), which can be moved repeatedly relative to one another from an open receiving position into a molding sealing position, and includes an extrusion unit (12), which can be used to insert at least one extruded plastic hose (14) into the open receiving position of the molding tools (18). A traversing unit (20) moves the extrusion unit (12) in conjunction with each extruded plastic hose (14) in opposite directions with respect to the molding device (16), which is stationary in every position of the molding tools (18).

9 Claims, 7 Drawing Sheets

(51) Int. Cl.
*B29C 48/09* (2019.01)
*B29C 48/25* (2019.01)
*B29C 49/22* (2006.01)
*B29C 49/46* (2006.01)
*B29C 49/56* (2006.01)
*B29L 31/00* (2006.01)

(52) U.S. Cl.
CPC ...... *B29C 48/252* (2019.02); *B29C 49/04106* (2022.05); *B29C 49/22* (2013.01); *B29C 49/46* (2013.01); *B29C 49/56* (2013.01); *B29C 2049/4664* (2013.01); *B29C 2793/009* (2013.01); *B29L 2031/7158* (2013.01)

(58) Field of Classification Search
CPC .............. B29C 49/04; B29C 49/04104; B29C 49/04118; B29C 49/32; B29C 49/4106; B29C 2049/325; B29C 49/70
See application file for complete search history.

(56) References Cited

U.S. PATENT DOCUMENTS

| | | | |
|---|---|---|---|
| 9,333,694 | B2 | 5/2016 | Price |
| 10,471,644 | B2 † | 11/2019 | Stevenson |
| 2006/0231986 | A1 | 10/2006 | Dueringer et al. |
| 2010/0310701 | A1 | 12/2010 | Hansen |
| 2010/0330219 | A1 | 12/2010 | Dueringer et al. |
| 2014/0291877 | A1 * | 10/2014 | Takahashi ......... B29C 49/28008 425/541 |
| 2015/0209995 | A1 * | 7/2015 | Price ..................... B29C 49/70 425/524 |
| 2019/0160723 | A1 * | 5/2019 | Stevenson .............. B29C 49/58 |

FOREIGN PATENT DOCUMENTS

| | | | |
|---|---|---|---|
| EP | 2 310 181 | | 4/2012 |
| EP | 2 909 000 | | 12/2018 |
| WO | WO-2009135682 A2 * | 11/2009 | ........... B29C 33/005 |

OTHER PUBLICATIONS

International Search Report (ISR) issued Oct. 5, 2021 in International (PCT) Application No. PCT/EP2021/067718.

* cited by examiner
† cited by third party

DEVICE AND METHOD FOR MANUFACTURING PLASTIC CONTAINERS

FIELD OF THE INVENTION

The invention relates to a device for producing plastic containers by means of a molding, filling and sealing process, at least including a molding device having individual molding tools, which can be moved repeatedly relative to one another from an open receiving position into a molding sealing position, and an extrusion unit, which can be used to insert at least one extruded plastic hose into the open receiving position of the molding tools.

BACKGROUND OF THE INVENTION

EP 2 909 000 B1 discloses a device for continuously producing container products from plastic materials by performing a molding, filling and sealing process. The device has a molding device, to which a molded tube of plasticized plastic material can be fed by means of a stationary extrusion device. The molding device has movable mold surfaces, which simulate a predefinable container geometry and in contact with which the molding tube can be placed for a molding, filling and sealing process.

The mold-surface molding jaws of the molding device can be moved between a mold-closing position and a mold-opening discharge position by means of a closing unit having a direction of motion perpendicular to the vertical direction of motion of the mold hose. A displacement unit can be used to move the clamping unit vertically downwards from a starting position during the molding, filling and sealing process in conjunction with the motion of the molding hose, and then back upwards to the starting position in the opposite direction once this process is complete.

SUMMARY OF THE INVENTION

The invention addresses the problem of improving the known device for producing plastic containers with regard to its efficiency. In addition, an improved method of manufacturing such a plastic container is disclosed. This problem is solved by a device for producing plastic containers by means of a molding, filling and sealing process and a method for producing such a container according to the invention.

The device according to the invention for producing plastic containers by means of a molding, filling and sealing process includes a traversing unit to move the extrusion unit in conjunction with each extruded plastic hose in opposite directions with respect to the molding device, which is stationary in every position of the molding tools.

Owing to these features, the molding by means of the molding tool according to the invention can be performed in a stationary manner, while the extrusion unit is used to continuously extrude the plastic hose. The stationary arrangement of the molding tool has the advantage—compared to the prior art device—that it does not have to be moved back and forth in the extrusion direction of the plastic hose in a kinematically complex manner. This not only eliminates the need to move the molding tool, which can be very heavy if several cavities are provided for the production of one container product each, but also facilitates the precise alignment of the mold halves of the stationary molding tool to each other for the production of the container product. In addition, owing to the stationary arrangement of the molding tool according to the invention, its ports, for instance in the form of a power supply, a cooling medium supply and/or a compressed air supply, do not have to be moved along during motions of the molding tool in the extrusion direction. This reduces the energy consumption of the device, permitting the device to be operated in an efficient manner. In addition, the linear, line and cable guides, which are essentially located on the sterile filling or production side, can be dispensed with, making for a much better technical design under conditions compliant with Hygienic Design.

The invention also addresses the problem of providing a method of manufacturing plastic containers comprising at least the method steps outlined below: continuous extrusion of at least one vertically oriented plastic hose by means of an extrusion unit, which can be moved vertically up and down in the direction of one receiving space each of a stationarily arranged molding tool; in so doing: i. moving the extrusion unit in the direction of the opened molding tool along a route that essentially equals the total height of a finished plastic container, in order to bring part of the respective, continuously extruded hose into a molding position in the respective receiving space of the molding tool; ii. molding the respective part of the continuously extruded hose and sealing it while forming the respective plastic container by operating the molding tool and simultaneously moving the lowered extrusion unit in the opposite direction while increasing the axial distance to the molding tool; whereby at least one plastic container chain is continuously produced by passing through the process steps i. and ii. at least twice; and separating each plastic container from the plastic container further upstream in the plastic container chain.

The extrusion of the plastic hose is continuous and permanent in the manufacturing method according to the invention. Compared to a discontinuous manufacturing process, in which a hot knife is used to separate hose sections from the entire hose while forming a hose opening and the hose sections are then transported to a filling device, the continuous manufacturing process has the advantage of the continuously extruded plastic hose ensuring a sterile, sealed environment for the contents inside the hose during the filling and sealing process of the container, in the manner of a hermetic partition wall, in this way complying with increased sterilization requirements.

Based on the device according to the invention or based on the method according to the invention, the process speed (cycle time) can be increased, thereby achieving a higher output rate. In contrast, the prior art device has long process times due to complex motion sequences, which can be reflected in a lower output rate. The long process times are also due to long "dead times" caused by additional motion sequences in which, however, no process-relevant actions occur.

In addition, the device and the method according to the invention contribute to the reduction of the amount of waste caused by the process, which improves the environmental balance and resource utilization of the production line. In contrast, some of the devices known from the prior art result in a disproportionately high waste portion, in particular in the case of small-volume containers, where the waste content per operating cycle can be up to 60%. For the devices known from the prior art, the mold heights cannot be reduced because of the process used and the limitations caused by the mechanical design of the device, and thus, the process-inherent waste cannot be reduced because of the way the system operates.

In addition, the overall complexity of the device according to the invention regarding design and control can be reduced, allowing shorter lead times in planning, production and commissioning of new projects using such machines. In contrast, the devices known from the prior art require an enormous amount of design and control engineering. The central process and clamping unit alone require a large number of complex production parts and individual components, the individual functions of which first have to be synchronized with each other.

Furthermore, an improvement of the so-called run-time efficiency (RTE) can be achieved by reducing the system complexity of the device according to the invention and the resulting improved process stability. Because of the complex process flow of devices known from the prior art, there is an increased susceptibility to failure of machine functions or failure of individual components, which can have a detrimental effect on the runtime stability of the system under production conditions (RTE).

Furthermore, due to its small footprint and reduced overall height, the device according to the invention can be integrated much more easily in existing lines or in environments having structural limitations. Owing to their complex structure, the space requirement of the devices known from the prior art is high. State-of-the-art systems are thus much more difficult to integrate into existing lines because the required conversion measures of downstream units located in the clean room are associated with high additional costs and are often not even feasible for reasons of design or space.

Furthermore, the device according to the invention can be used to perform a continuous extrusion process using endless single- and multi-layer tubes without the use of a hot knife, and the travel distance of the filling mandrels, in particular during calibration processes (LUER calibration), is reduced, thus reducing process-related wear of mandrel tube surfaces and the associated intrinsic particle formation, which can contaminate the filling material.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DECRYPTION OF THE INVENTION

Figure 1:
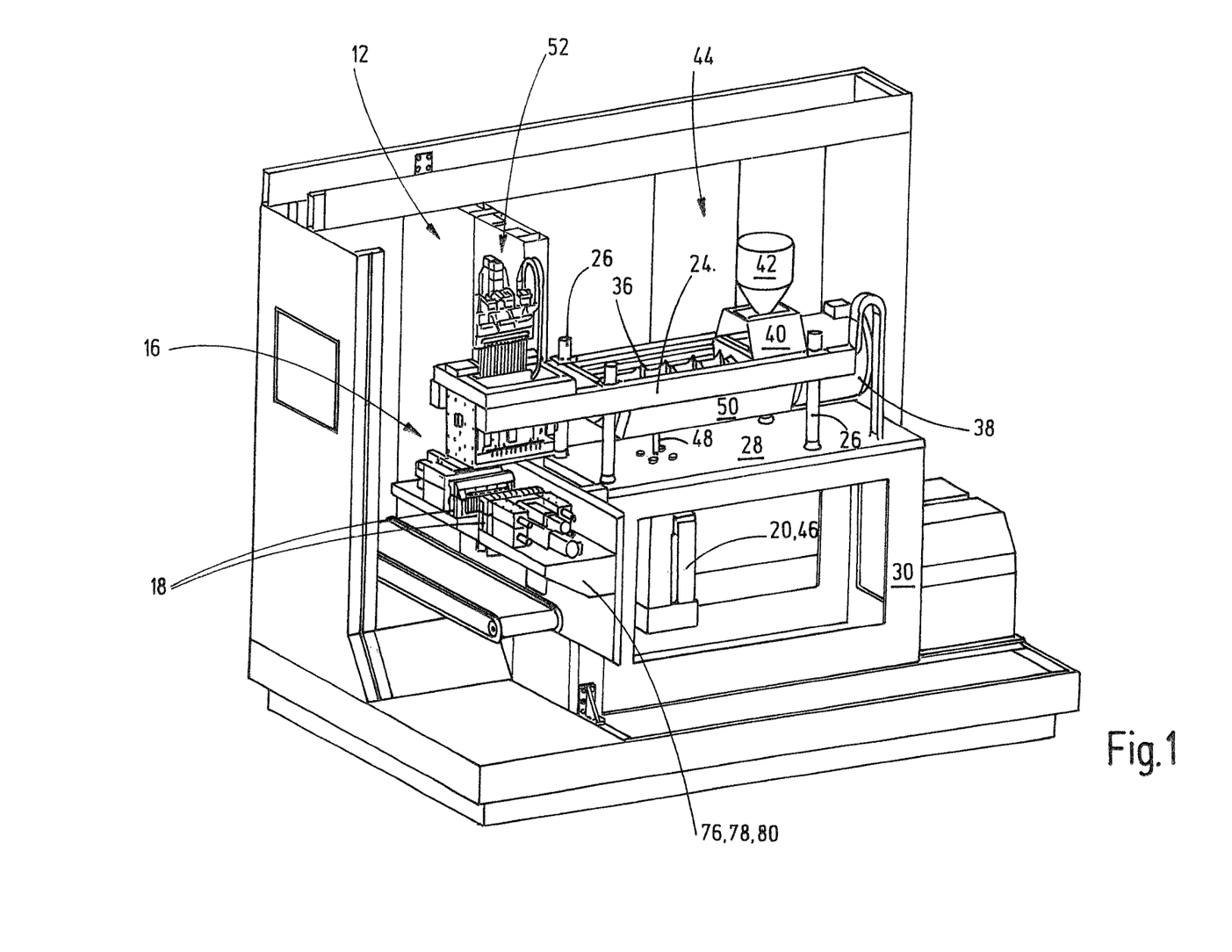
FIG. 1 is a perspective view of a device for producing plastic containers according to an exemplary embodiment of the invention.
Figure 2:
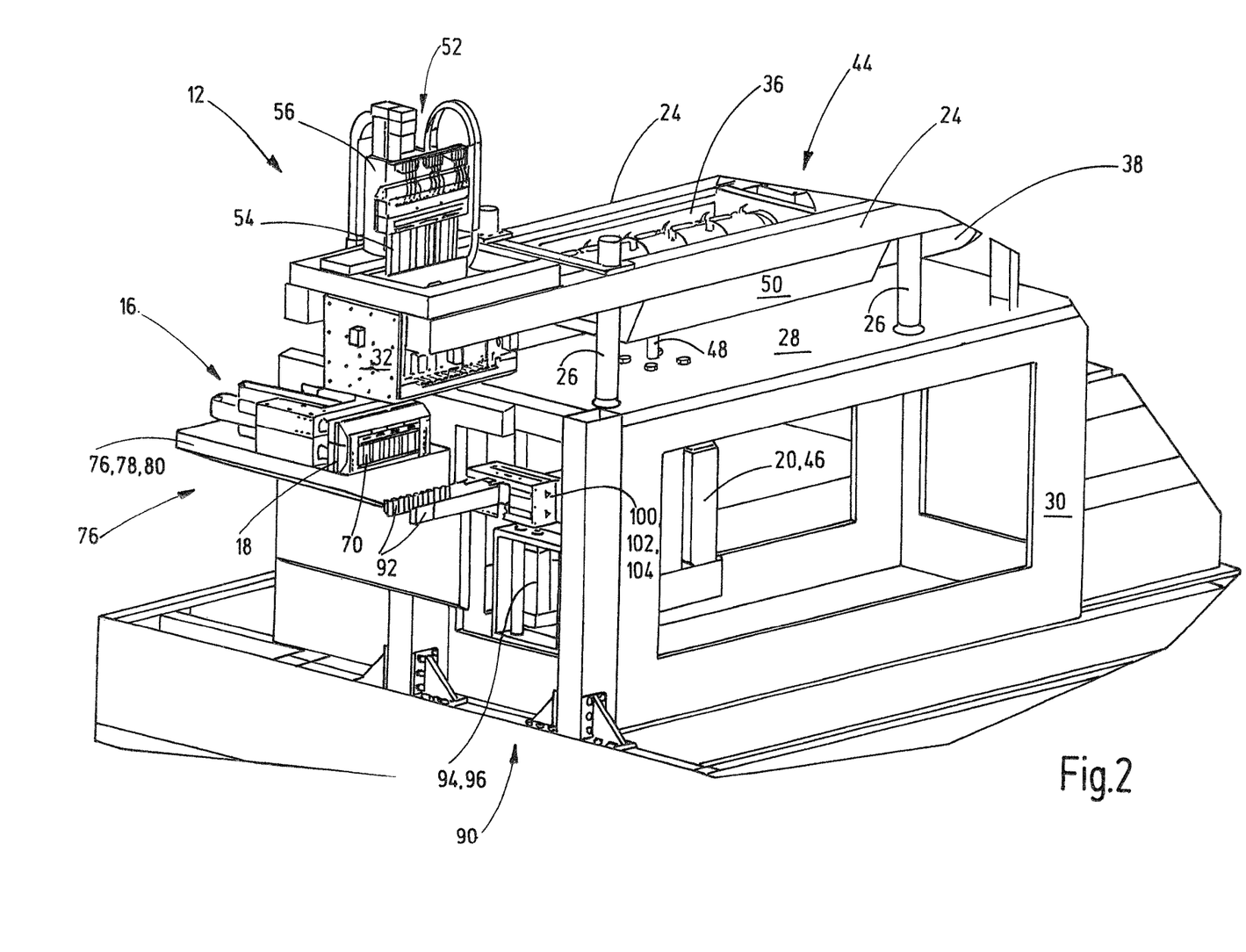
FIG. 2 is an enlarged, compared to FIG. 1, perspective view of essential components of the device from FIG. 1.

FIGS. 1 and 2 show a device according to the invention for producing plastic containers 10 by means of a molding, filling and sealing process, also referred to in technical terms as the bottlepack® process. The device has a movable extrusion unit 12 for extruding at least one plastic hose 14 and a stationary molding device 16 having individual molding tools 18, which can be moved relative to one another between an open receiving position and a closed molding position. The extrusion unit 12, in conjunction with each extruded plastic hose 14, can be moved in opposite directions relative to the molding device 16, which is arranged in a stationary position in every travel position of the molding tools 18, by means of a first traversing unit 20, whereby the respective plastic hose 14 can be introduced into a receiving space 22 of the molding tools 18 arranged in the receiving position.

The first traversing unit 20 is used to vertically traverse the extrusion unit 12 between an upper end position and a lower end position in directions opposite from each other. The first traversing unit 20 can be used to linearly move the extrusion unit 12 in such a way that by raising the extrusion unit 12 starting from the lower end position in the direction of the upper end position, the respective plastic hose 14 can be extruded continuously and held on tension while the molding device 16 is closed, and by lowering the extrusion unit 12 starting from the upper end position in the direction of the lower end position, part of the respective plastic hose 14 extruded in this way can be brought from an extrusion position into a molding position between the opened molding tools 18 of the molding device 16.

The extrusion unit 12 has two spaced-apart from each other and parallel to each other extending longitudinal beams 24 that are oriented perpendicular to the direction of travel of the extrusion unit 12 and perpendicular to the direction of travel of the molding tools 18. Every longitudinal beam 24 is guided along two vertically aligned guide columns 26, which are spaced apart from each other and are secured on a closed top plate 28 of a cuboid frame 30 and extend through the respective longitudinal beam 24. An extrusion head 32 of the extrusion unit 12 is secured between the end areas facing the molding device 16 of the longitudinal beams 24, wherein the extrusion head 32 has at least one annular extrusion nozzle 34, each for dispensing the plasticized plastic in tubular shape. In the direction of the end facing away from the molding device 16, of the longitudinal beams 24, an extrusion screw unit 36 secured between the longitudinal beams 24, adjoins to the extrusion head 32, wherein the extrusion screw unit 36 serves for melting plastic granules into plasticized plastic and for supplying the extrusion head 32 with this plasticized plastic material. A conventional drive 38, which is arranged partly between the end areas facing away from the molding device 16 of the longitudinal beams 24 and partly protruding beyond the longitudinal beams 24 in the direction away from the molding device 16, can be used to drive the screw unit 36. In the end area facing the drive 38, of the screw unit 36, a collection hopper 42 supported by an angled holding part 40 extends away from the screw unit 36 counter to the extrusion direction of the hose 14 and is provided to feed plastic granules into the screw unit 36. In this respect, the screw unit 36 and its drive 38 and the collecting hopper 42 are part of a plasticizing unit 44 of the extrusion unit 12.

A first drive 46 secured to the head plate 28 of the frame 30, of the first traversing unit 20 is arranged in the cuboid frame 30. An actuator rod 48 of the first actuator 46 extends through the head plate 28 and acts end-sided on a support arrangement, in particular on a trough 50, of the screw unit 36. The extrusion unit 12 can be repeatedly moved from an upper end position to a lower end position, as viewed in the direction of FIGS. 1 and 2, by extending and retracting the actuator rod 48 of a servomotor as the first drive 46.

The extrusion head 32 is coupled to a filling device 52 having at least one filling mandrel 54 that extends vertically at least partially through the extrusion head 32. A respective filling mandrel 54 is used to fill a fluid into the respective container body molded by means of a main mold 60. An additional traversing unit 56 can be used to move every filling mandrel 54 between an upper end position and a lower end position or discharge position relative to the extrusion head 32, in which lower end position or discharge position the respective filling mandrel 54 extends downwards away from the extrusion head 32, encompassed by the respective extrusion nozzle 34, into the interior of the respective hose 14. Additional air guides for introducing support air between the respective filling mandrel 54 and the plastic hose 14 surrounding it are not shown for reasons of simplicity. Blowing air can also be supplied via the filling mandrel 54, if required, for molding the container 10 in the molding tool 18 before the fluid is introduced into the container via the filling mandrel 54. Special air nozzles can also be used to supply blowing or molding air independently of the filling mandrel 54, for instance concentrically thereto. Incidentally, the forming of the container 10 can be achieved as a whole or in part by applying a vacuum to the mold halves 18, into which the container product 10 is initially placed as a tube 14.

For moving the molding tools 18 of the molding device 16 relative to one another and transversely to the direction of travel of the extrusion unit 12, namely in the horizontal direction, a second traversing unit 58 is provided, by means of which the molding tools 18 can be moved between the open receiving position and the molding closing position in opposite directions relative to one another.

The four molding tools 18 of the molding device 16 in total are divided into groups. Two molding tools 18 of a main mold 60 establish the first group and are used to shape a container body of a respective plastic container 10. Two molding tools 18 of a head mold 64 establish the second group and are used to form a head portion of this plastic container 10. In each of their traversing positions, the two molding tools 18 of each group 60, 64 are mirrored opposite to each other on a fictitious plane 68, which is perpendicular to the direction of travel of the molding tools 18 and in which plane 68 the longitudinal axis of each filling mandrel 54 is located. Viewed in the extrusion direction of the plastic hose 14, first the group of the head mold 64 is provided, followed by the group of the main mold 60 without spacing. The facing surfaces of the two molding tools 18 of each group 60, 64 are formed as molding surfaces 70. The respective molding tool 18 of the head mold 64 has an inclined surface 72 extending from the molding surface 70 towards the extrusion head 32 and away from the tube 14. The two inclined surfaces 72 of the head molding tools 18, 64 form a V-shaped recess when the head mold 64 is closed. In this way, an immediate process sequence of longitudinal rows of containers 10 to be produced can be created in the manner of a continuous vertical container chain 74, which can be done using little material input avoiding unnecessary waste between the longitudinal rows of containers in the chain 74.

A support device 76, which has a horizontally oriented support plate 78, on which the molding device 16 is arranged, is provided for mounting the molding device 16. The support plate 78 has two support plate parts 80 that are spaced apart symmetrically with respect to the plane 68. Stacked on top of each other in the center area of each support plate part 80, two cuboid guide parts are provided as guide blocks 82, which are aligned in the direction of travel of the molding tools 18. Each guide block 82 is used to guide two respective guide rods 84 for guiding a respective molding tool 18, the free ends of which guide rods are each coupled to the same mold support 88, which supports the respective molding tool 18. In addition, every guide block 82 is used to guide two actuator rods that extend between the guide rods 84 in the direction of travel of the molding tools 18 through the respective guide block 82. The respective actuator rod can be driven by means of a second linear drive 86 of the second traversing unit 58. The respective second drive 86 is electromechanical, again in the form of a servomotor, and is secured to the end face facing away from the relevant molding tool 18, of the respective guide block 82. The respective mold support 88 is attached to the respective free end of the actuator rod. Synchronous retraction and extension of the actuator rods of the second drives 86 for the respective mold jaws 18 of the head mold 64 allows the latter to be brought from its closed or receiving position to its receiving or closed position. Independent of the travel motions of the head mold 64, the main mold 60 with its adjacent opposing mold jaws 18 can be moved from its closed or receiving position to its receiving or closed position by synchronous extension and retraction of the actuator rods of the second drives 86.

Furthermore, a gripping device 90 is provided with clamping bars 92, each of which extends in parallel directions to the molding plane 68 and is arranged mirrored on the plane 68 opposite from one another in each of their travel positions. A third traversing unit 94 can be used to move the clamping bars 92 in the traversing direction of the first traversing unit 20, i.e., vertically, between an upper end position, in which the clamping bars 92 are arranged between the opened main mold 60, and a lower end position, in which the clamping bars 92 are arranged on the side facing away from the extrusion head 32, of the mold device 16 below the latter. The clamping bars 92 are arranged between the two support plate parts 80 in the center area of their traversing path. The third actuator 96 of the third traversing unit 94 is disposed in the frame 30 and has a vertical actuator rod that acts on a base body 100 of the gripping device 90. The terminal strips 92 are secured standing to the base body 100. By extending or retracting the actuator rod of the third traversing unit 94, the base body 100 or the clamping bars 92 can be brought from a lower or upper end position to an upper or lower end position. A fourth traversing unit 102 can be used to horizontally move the clamping bars 92 between a clamping position receiving at least one finished and filled container 10 and a release position releasing the respective container 10 for removing the container chain 74 from the device. A drive 104 of this fourth traversing unit 102 is assigned to the base body 100 of the gripping device 90.

The term "upper and lower end position" of a respective movable device shall be understood to denote that, when the device according to the invention is functionally arranged, this end position is equal to the position furthest away from or closest to an installation surface (hall floor) of the device.

The operating principle of the device according to the invention is explained based on the production method according to the invention in more detail below:

The extrusion unit 12 is used to continuously extrude at least one vertically oriented plastic hose 14 in the direction of the stationary molding device 16. In this context, "continuous" shall be understood to mean that the discharge rate of the plastic tubing 14 from the extrusion unit 12 remains substantially uninterrupted the same throughout the entire manufacturing process. Continuous manufacture is interrupted for maintenance purposes or mold changing operations, as well as for cleaning purposes, etc.

Figure 4:
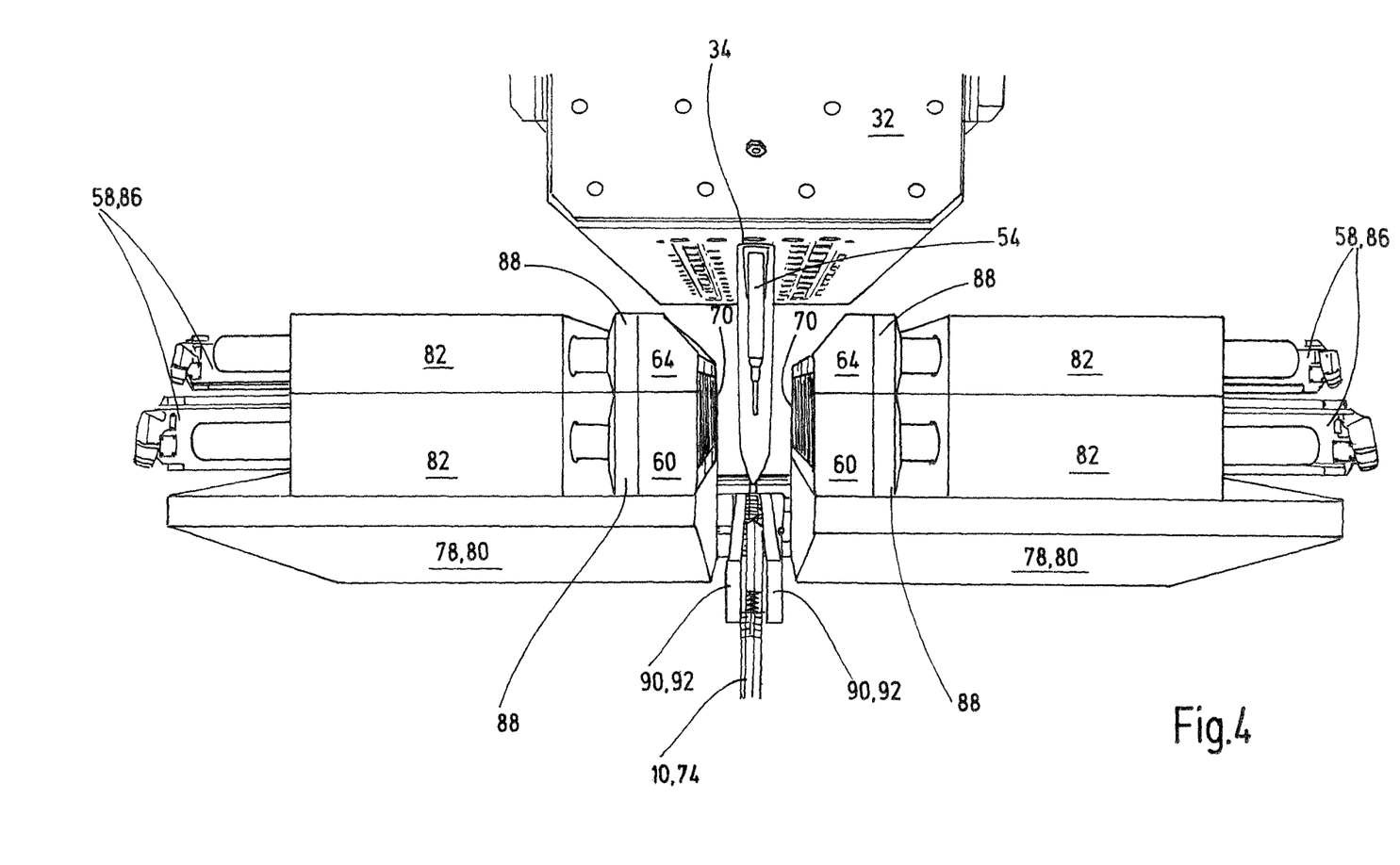
FIG. 4 is a perspective frontal view of the device of FIG. 3 wherein the closed gripping device is arranged below the opened molding device.

At the start of a process cycle, the extrusion unit 12, together with every continuously extruded hose 14 extruded hose 14, is moved by means of the first traversing unit 20, starting from its upper end position in the direction of the opened molding device 16, over a distance equal to the total height of a finished plastic container 10 minus the length of tube extruded during this traversing motion. As a result, a part of the respective hose 14 arranged above the molding device 16, is brought into a molding position in the respective receiving space 22 of the molding device 16 (FIG. 4). Simultaneously to the traversing motion of the extrusion unit 12, the gripping device 90, which is arranged in its clamping position and grips at least one container 10 in a clamping manner, which container adjoins the part of the relevant hose 14 and has been completed, is moved by means of the third traversing unit 94 from its upper end position, arranged between the molding tools 18 of the molding device 16, in the direction of its lower end position, arranged below the molding device 16. In this way, the gripping device 90 holds every hose-container chain 74 in tension relative to the extrusion head 32 when the molding device 16 is open. Simultaneously with the traversing motions of the extrusion unit 12 and the gripping device 90, the at least one filling mandrel 54 in the respective hose interior is extended from its upper end position in the direction of its lower end position.

Figure 5:
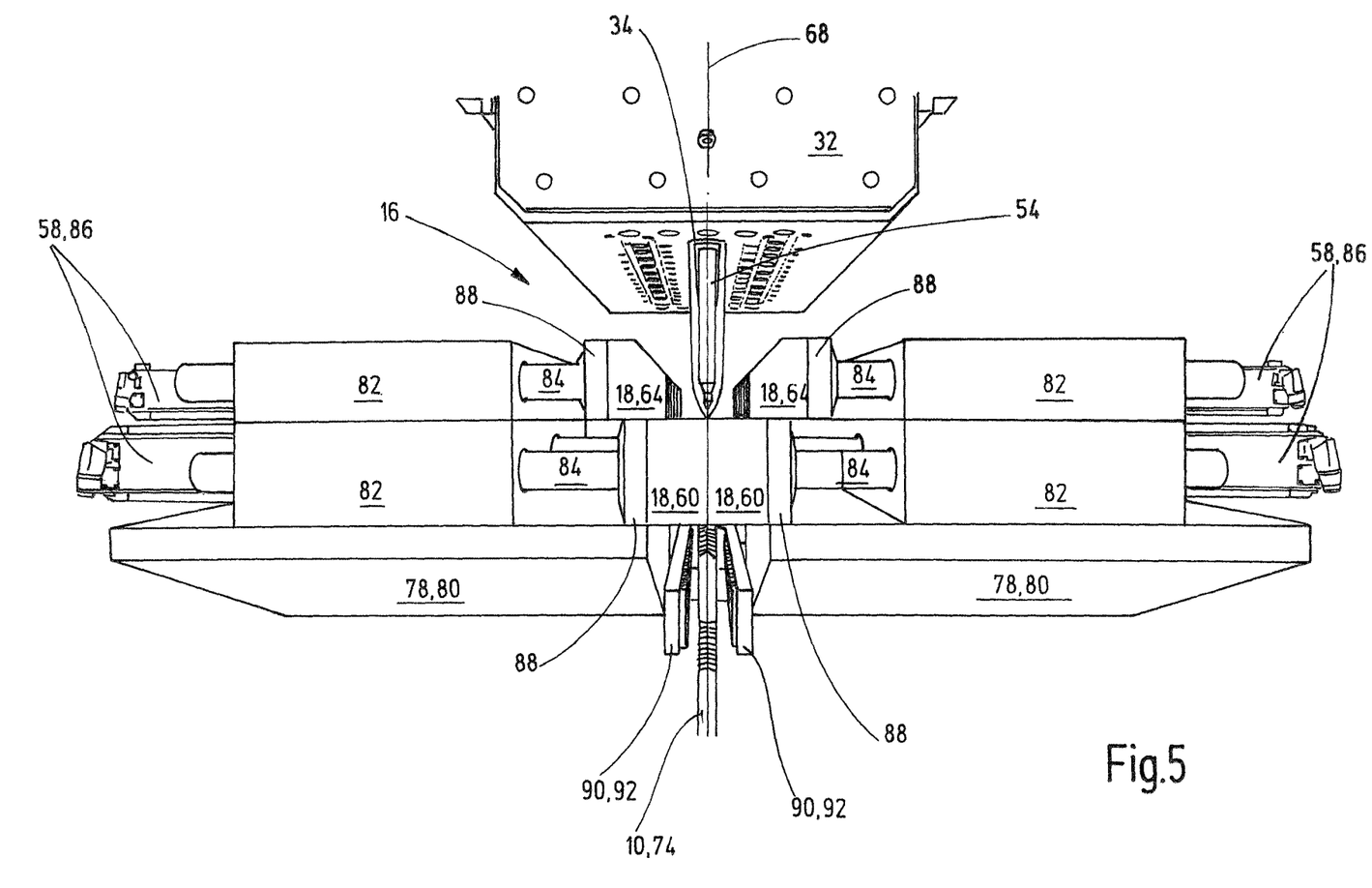
FIG. 5 shows a perspective frontal view of the device of FIG. 3 wherein the opened gripping device arranged below the molding device releases the respective container when the head mold is open and the main mold of the molding device is closed.

Subsequently, the second traversing unit 58 is used to move the main mold 60 from its open receiving position to its closed molding position (FIG. 5), and the respective body of one or more plastic containers 10 is molded from the respective portion of the continuously extruded hose 14, arranged between the main molding tools 18, 60, which plastic containers 10 extend horizontally in a longitudinal row into the image plane. The filling mandrel 54, which is moved into its lower end position, is then used to fill a presettable filling quantity into a respective container body, wherein one filling mandrel 54 is assigned to each container in the longitudinal row. For this purpose, the respective filling mandrel 54 extends between the opened molding tools 18 of the head mold 64, and the free end of this filling mandrel 54 extends between the molding tools 18 of the main mold 60 into the interior of the respective container body. Immediately after the main mold 60 has been shut or closed, the gripping device 90 is moved from its clamping position to its release position releasing the individual container 10 by means of the fourth traversing unit 102.

Figure 6:
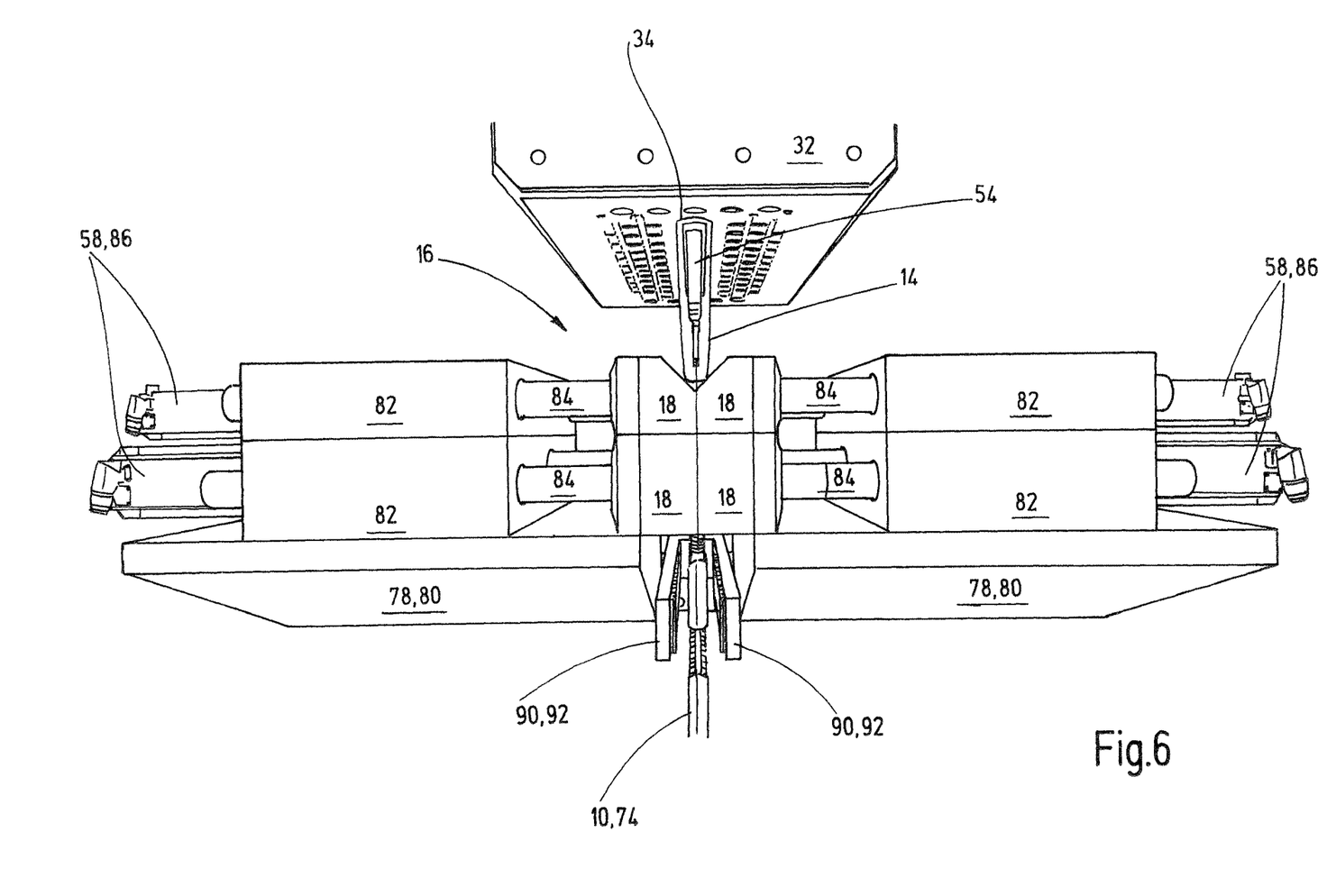
FIG. 6 is a perspective frontal view of the device of FIG. 3 wherein the opened gripping device arranged below the molding device releases the respective container when the molding device is closed.

Then the respective filling mandrel 54 is moved towards its upper end position. Thereafter, the second traversing unit 58 moves the head mold 64 is from its open receiving position to its closed molding position (FIG. 6) and the head of the plastic container 16 is molded from the respective part of the hose 14 that is arranged between the head molding tools 18, 64. In this process, the respective container 10 is hermetically sealed or sterilely sealed, thereby completing a molded, filled and sealed container 10.

For the respective molding, the supply of sterile air generates an overpressure in the respective plastic hose 14, which overpressure stabilizes the respective plastic hose 14 in its molding course in the direction of the molding surfaces 70 of the respective molding tool groups 60, 64. Alternatively or additionally, a negative pressure is generated inside the respective molding tool groups 60, 64 and outside the hose 14, which negative pressure causes the hose 14 to contact the molding surfaces 70 of the respective closed molding tool groups 60, 64.

Figure 7:
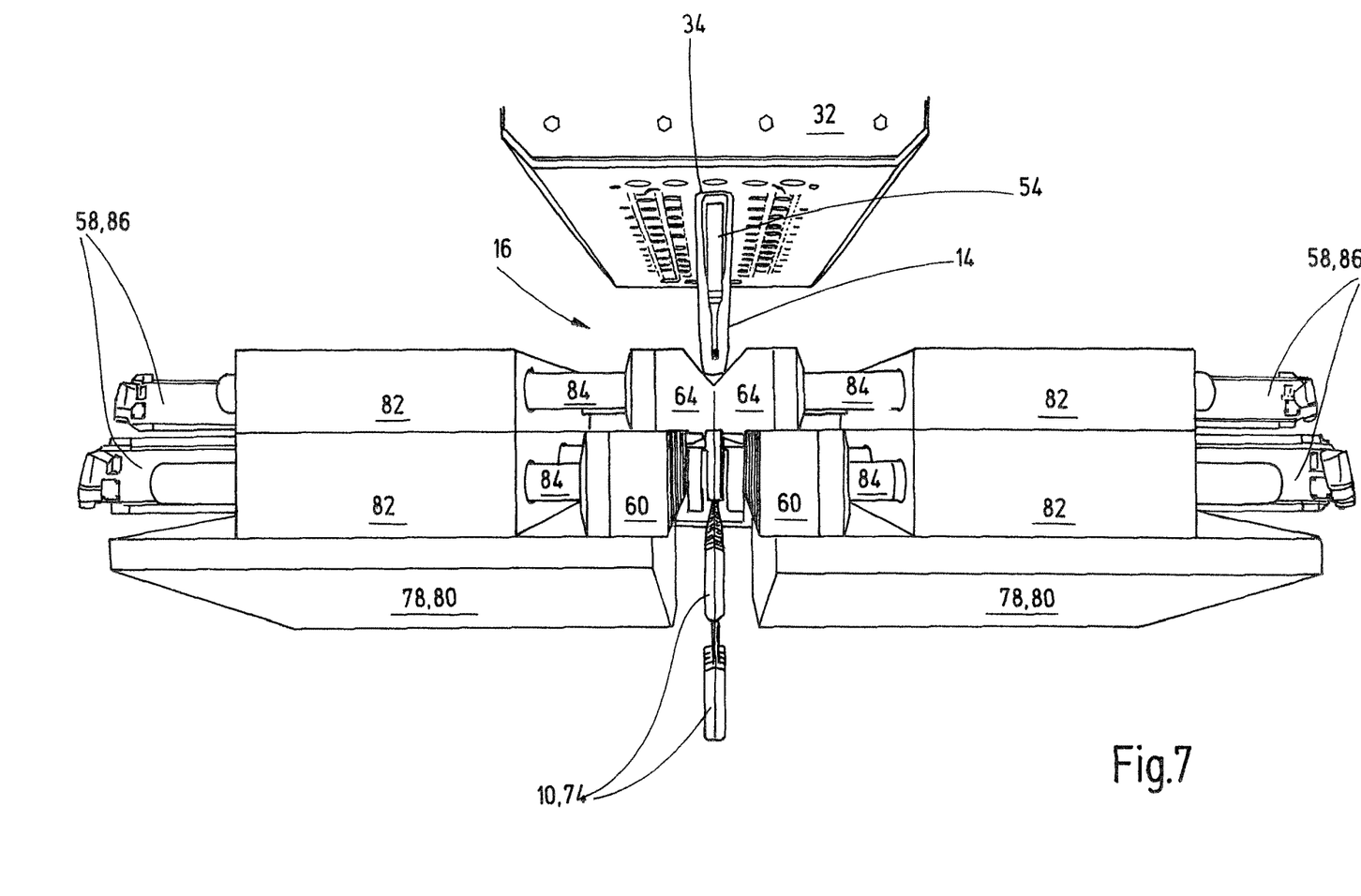
FIG. 7 is a perspective frontal view of the device of FIG. 3 wherein the closed gripping device, arranged in the opened main mold while the head mold is closed, holds the respective container in a clamping manner.

Subsequently, the second traversing unit 58 (FIG. 7) opens the main molding tools 18, 60, whereupon the third traversing unit 94 moves the gripping device 90 into its upper end position between the main molding tools 18, 60 along the container chains 74. In doing so, the gripping device 90 travels a distance largely equal to the total height of a completed container 10. In the upper end position, the fourth traversing unit 102 moves the gripping device 90 from its release position to its clamping position, where it clamps a respective container 10.

Because the extrusion unit 12 continuously extrudes the plastic hose 14, the extrusion unit 12 moves in conjunction with the hose 14 toward its upper end position at a speed matching the extrusion speed of the hose 14, while at least one of the molding tool groups 60, 64 is closed for holding the plastic hose 14 in tension. Because of the process, the extrusion unit 12 moves at a higher speed in the direction of its lower end position than the extrusion speed of the hose 14.

Figure 3:
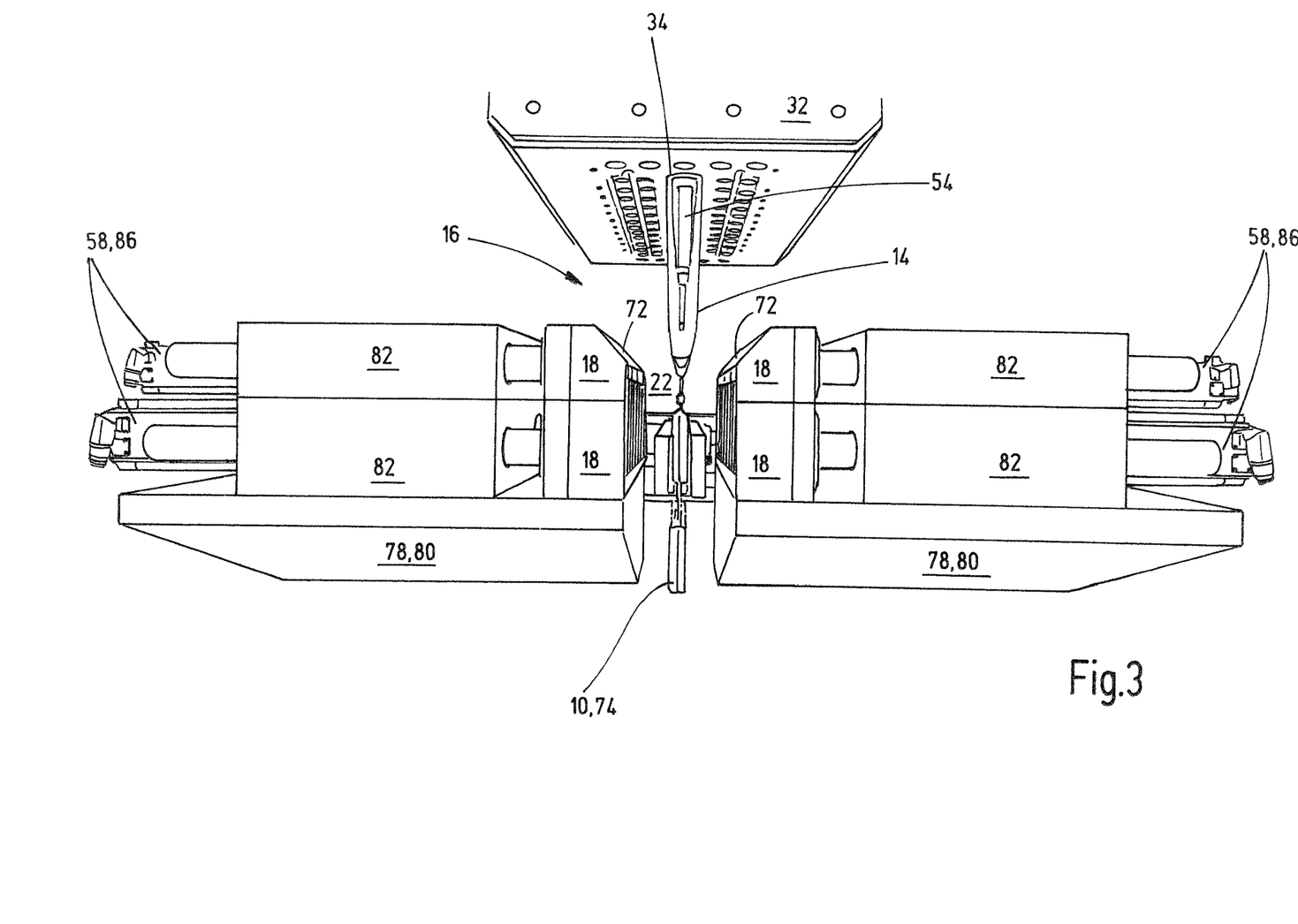
FIG. 3 is a perspective frontal view of an extrusion head, a molding device and a gripping device of the device of FIG. 2, wherein the closed gripping device is arranged in the opened molding device and holds at least one container of a tube-container chain in a clamping manner.

Thereafter, the second traversing unit 58 (FIG. 3) opens the head molding tools 18, 64, whereupon the process for producing at least one further molded, filled and sealed container 10 can be repeated. By passing through the process at least twice, at least one plastic container chain 74 is continuously produced, the last completed container 10 of which is connected to the plastic hose 14, prior to any subsequent cut off.

Finally, every plastic container 10 is separated (not shown) from its upstream plastic container 10 in the respective plastic container chain 74 to achieve a final product ready for sale.

While one embodiment has been chosen to illustrate the invention, it will be understood by those skilled in the art that various changes and modifications can be made therein without departing from the scope of the invention as defined in the claims.

The invention claimed is:

1. A device for producing plastic containers by a molding, filling and sealing process, comprising:
    a mold having individual molding tools movable repeatedly relative to one another in opposite directions between an open receiving position and a molding sealing position by a mold traverser coupled to the molding tools, the mold being stationary in every position of the molding tools, the molding tools of the mold being subdivided as pairs into groups as a main mold for molding a container body of a container and a head mold for molding a head part of the container;
    an extruder capable of producing extruded plastic hose into the open receiving position of the molding tools, the main mold having an inlet end facing the extruder for receiving the extruded plastic hose and an outlet end facing away from the extruder through which the container produced in the mold is discharged;

an extruder traverser being coupled to and moving the extruder with the extruded plastic hose in opposite directions transverse with respect to the mold;

a gripper being insertable into the outlet end of the main mold and gripping at least part of the container produced in a preceding production step in a detachable manner at least when the head mold is closed while the main mold is open; and an actuator configured to move the gripper from a lower end position below the outlet end of the main mold to an upper end position above the outlet end of the main mold and below the head mold.

2. The device according to claim 1, wherein:

the molding tools of the mold are movable relative to one another in opposite horizontal directions; and the extruder is movable by the extruder traverser vertically in opposite directions such that a part of the plastic hose is movable from an uppermost extrusion position into a lowermost molding position by extruder when lowered with a delivery length of the plastic hose remaining constant.

3. The device according to claim 2, wherein upon subsequent opening of the head mold, the gripper removes the container from the mold as part of a vertically aligned container chain by a first gripper traverser.

4. The device according to claim 3, wherein when the main mold is closed, as viewed in an extrusion direction below the main mold, the gripper is movable by a second gripper traverser from a clamping position, in which the container is received, into a release position, in which the container is released, and vice versa.

5. The device according to claim 2, wherein when the extruder is lowered, a filling mandrel fills the container body molded in the main mold, a free end of the filling mandrel engaging between the molding tools of the main mold into an interior of the container body of the container.

6. The device according to claim 2, wherein the extruder is guided in upward and downward motions in conjunction with a plasticizing unit of the extruder upstream in a production sequence via a column guide supported on columns with respect to at least one other machine unit of the device and is guided linearly upwards and downwards by the extruder traverser.

7. The device according to claim 2, wherein the extruder is configured to execute an upward motion and a downward motion in vertical directions by the extruder traverser.

8. A method of manufacturing plastic containers, comprising method steps of:

continuously extruding a vertically oriented plastic extruded hose by an extruder movably vertically up and down in a direction of a mounting space of a stationary molding tool;

moving the extruder in the direction of the molding tool when the molding tool is opened along a distance substantially equal to a total height of a finished plastic container or bringing a part of the extruded hose being continuously extruded into a molding position in a receiving space of the molding tool;

molding and sealing the part of the extruded hose while forming the plastic container by actuating the molding tool and simultaneously moving the extruder after being lowered in an opposite direction while increasing the axial distance of the extruded hose to the molding tool;

continuously producing a plastic container chain by passing through process steps the moving of the extruder and the molding and sealing the part of the extruded hose at least twice;

inserting a gripper into an outlet end of a main mold of the molding tool facing away from the extruder and opposite from an inlet end of the main mold facing the extruder, the gripper gripping at least part of the container produced in a preceding production step in a detachable manner at least when a head mold of the molding tool is closed while the main mold is open; and separating each plastic container from a formed plastic container chain.

9. The method according to claim 8, wherein the gripper tensions the plastic container chain and grips the plastic container chain after a body of each plastic container has been molded.

\* \* \* \* \*